United States Patent
Yu (10) Patent No.: US 9,442,825 B2
(45) Date of Patent: Sep. 13, 2016

(54) METHOD AND DEVICE FOR SIGNING PROGRAM CRASH

(71) Applicant: Tencent Technology (Shenzhen) Company Limited, Shenzhen (CN)

(72) Inventor: Weijun Yu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 232 days.

(21) Appl. No.: 14/292,013

(22) Filed: May 30, 2014

(65) Prior Publication Data

US 2014/0310562 A1 Oct. 16, 2014

Related U.S. Application Data

(63) Continuation of application No. PCT/CN2013/089915, filed on Dec. 19, 2013.

(30) Foreign Application Priority Data

Apr. 15, 2013 (CN) .......................... 2013 1 0130187

(51) Int. Cl.
| | | |
|---|---|---|
| *G06F 11/00* | (2006.01) | |
| *G06F 11/36* | (2006.01) | |
| *G06F 11/34* | (2006.01) | |
| *G06F 11/07* | (2006.01) | |

(52) U.S. Cl.
CPC ......... *G06F 11/366* (2013.01); *G06F 11/0715* (2013.01); *G06F 11/0778* (2013.01); *G06F 11/0766* (2013.01); *G06F 11/3466* (2013.01); *G06F 11/3636* (2013.01)

(58) Field of Classification Search
CPC ........... G06F 11/0778; G06F 11/3466; G06F 11/0766; G06F 11/3636
See application file for complete search history.

(56) References Cited

U.S. PATENT DOCUMENTS

| | | | |
|---|---|---|---|
| 2003/0005414 A1* | 1/2003 | Elliott ................. | G06F 11/0715 717/128 |
| 2005/0022136 A1 | 1/2005 | Hatscher et al. | |
| 2005/0283765 A1 | 12/2005 | Warren et al. | |
| 2011/0246986 A1* | 10/2011 | Nicholas ............. | G06F 11/0712 718/1 |
| 2013/0124926 A1* | 5/2013 | Cowie ................. | G06F 11/0736 714/45 |
| 2013/0290789 A1* | 10/2013 | Wen ...................... | G06F 11/079 714/37 |

FOREIGN PATENT DOCUMENTS

| | | |
|---|---|---|
| CN | 1704908 A | 12/2005 |
| CN | 101114253 A | 1/2008 |
| CN | 101256568 A | 9/2008 |
| CN | 101719090 A | 6/2010 |
| CN | 103019879 A | 4/2013 |
| CN | 103034575 A | 4/2013 |
| CN | 103164322 A | 6/2013 |
| CN | 102984580 A | 8/2013 |
| WO | WO 2014/106489 A1 | 7/2014 |

OTHER PUBLICATIONS

International Search Report to International Application No. PCT/CN2013/089915, dated Mar. 20, 2014 (12p).

* cited by examiner

*Primary Examiner* — Charles Ehne
(74) *Attorney, Agent, or Firm* — Brinks Gilson & Lione (57) ABSTRACT

A method and a device for signing a program crash are disclosed, which are applied to the filed of communication technology. The device for signing the program crash firstly acquires stack information invoked when the program crash occurs during executing a process of an application program by a computer system, then acquires first stack information corresponding to the process of the application program from the acquired stack information, and signs the occurred program crash based on the first stack information.

15 Claims, 3 Drawing Sheets

METHOD AND DEVICE FOR SIGNING PROGRAM CRASH

This application is a continuation of International application PCT/CN2013/089915, filed on Dec. 19, 2013 which claims the priority to Chinese Patent Application No. 201310130187.2, entitled "METHOD AND DEVICE FOR SIGNING PROGRAM CRASH", filed with the Chinese State Intellectual Property Office on Apr. 15, 2013, which are incorporated by reference in their entireties herein.

TECHNICAL FIELD

The disclosure relates to the field of computer technique, and particularly to a method and a device for signing a program crash reason.

BACKGROUND

During executing a process of an application program by a computer system, a program crash may occur due to the application program process itself, such as dividing by zero error, stack overflow, memory out of and null pointer. Therefore, how to determine the reason for an occurred program crash is important.

Conventionally, a process of an application program may run on different computer system of different user in different running environment, therefore, signatures for program crashes due to a same reason may be different for processes of two application programs which are substantially the same, and thus the determined reason for the program crash is not accurate.

SUMMARY

A method and a device for signing a program crash are provided according to embodiments of the disclosure, to make the determined reason for the program crash accurate.

In a first aspect, a method for signing a program crash is provided according to embodiments of the disclosure. The method includes: acquiring stack information invoked when the program crash occurs during executing a process of an application program by a computer system; acquiring first stack information corresponding to the process of the application program from the stack information; and signing the occurred program crash based on the first stack information.

In a second aspect, a device for signing a program crash is provided according to embodiments of the disclosure. The device includes a processor and a non-transitory storage medium accessible to the processor. The non-transitory storage medium configured to store units including: a stack acquisition unit, adapted to acquire stack information invoked when the program crash occurs during executing a process of an application program by a computer system; a program stack acquisition unit, adapted to acquire first stack information corresponding to the process of the application program from the stack information; and a signature unit, adapted to sign the occurred program crash based on the first stack information.

In the embodiments of the disclosure, the device for signing the program crash firstly acquires stack information invoked when the program crash occurs during executing a process of an application program by a computer system, then acquires first stack information corresponding to the process of the application program from the acquired stack information, and signs the occurred program crash based on the first stack information. In this way, since first stack information corresponding to a process of an application program can reflect the essence of the process of the application program and does not vary with different settings of computer systems of different users, i.e., different running environments for the process of the application program, the signature for the program crash acquired based on the first stack information can be used to uniquely determine the reason that the program crash occurs, and the case that signatures for program crashes due to a same reason are different for processes of two application programs which are substantially the same is avoided, thereby the finally determined reason for the program crash is accurate.

BRIEF DESCRIPTION OF THE DRAWINGS

To illustrate the solutions in embodiments of the disclosure or in the prior art more clearly, the drawings to be used in the description of the embodiments or the prior art are briefly introduced hereinafter. Apparently, the drawings described below are just some embodiments of the disclosure, and other drawings can be obtained by those skilled in the art based on these drawings without any creative work.

DETAILED DESCRIPTION

The solutions of embodiments of the disclosure will be described clearly and completely hereinafter in conjunction with the drawings in the embodiments of the disclosure. Apparently, the described embodiments are just part of embodiments of the disclosure. Other embodiments obtained by those skilled in the art based on the embodiments of the disclosure without any creative work should fall within the scope of protection of the disclosure.

Figure 1:
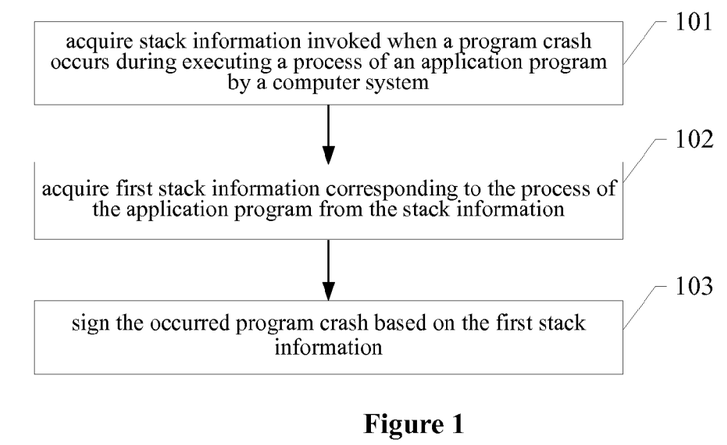
FIG. 1 is a flow chart of a method for signing a program crash according to an embodiment of the disclosure.

A method for signing a program crash is provided according to an embodiment of the disclosure, which is mainly used for signing a program crash occurred during executing a process of an application program by a computer system. The embodiment of the disclosure is a method performed by a device for signing a program crash, such as a server or a computer system executing a process of an application program. A flow chart of the method is shown in FIG. 1, which includes the following steps.

Step 101 includes acquiring stack information invoked when the program crash occurs during executing a process of an application program by a computer system.

The process of the application program described above is an active application program, i.e., an application program that occupies certain system resources after codes of the application program is put into corresponding computer system memory. An application program is referred to as a program before being invoked into a memory space, and may be referred to as a process after being invoked into a memory space and obtaining resources. The code of each application program is accordingly stored in a space segment of the memory. It can be understood that, during executing a process of an application program by the computer system, functions in the memory corresponding to the process of the application program may be invoked and certain functions may be achieved, therefore, the memory corresponding to the process of the application program may also store stack information, i.e., information relating to the invoking of the functions in the application program, such as invoking sequence of the functions and the invoking relationship among the functions (i.e., process context information). Generally, the function firstly invoked is stored at the stack bottom, and the function lastly invoked is stored at the stack top.

In the embodiment, if a program crash occurs during executing a process of an application program, the computer system can acquire the stack information described above based on information stored in the memory corresponding to the process of the application program that may be acquired when the program crash occurs.

Step 102 includes acquiring first stack information corresponding to the process of the application program from the stack information. Since the stack information includes function information invoked by the computer system itself during the operation, and function information invoked by the process of the application program when being executed, the stack information includes first stack information corresponding to the process of the application program and second stack information corresponding to the computer system. The first stack information of the stack information needs to be acquired in the embodiment.

Step 103 includes signing the occurred program crash based on the first stack information. An information identifier of the first stack information may be calculated during the signing. For example, a value of Message Digest Algorithm MD5 of the first stack information is calculated by Hash Algorithm; or an information identifier of concatenated information is calculated, where the concatenated information is obtained by concatenating the first stack information with some other information stored in the memory corresponding to the process of the application program when the program crash occurs. Such calculated information identifier may be used to uniquely identify the reason that the program crash occurs.

It can be seen that, in the embodiment of the disclosure, stack information invoked when the program crash occurs during executing a process of an application program by a computer system is firstly acquired, then first stack information corresponding to the process of the application program is acquired from the acquired stack information, and the occurred program crash is signed based on the first stack information. In this way, since first stack information corresponding to a process of an application program can reflect the essence of the process of the application program and does not vary with different settings of computer systems of different users, i.e., different running environments of the process of the application program, the signature for the program crash acquired based on the first stack information can be used to uniquely determine the reason that the program crash occurs, and the case that signatures for program crashes due to a same reason are different for processes of two application programs which are substantially the same is avoided, thereby the finally determined reason for the program crash is accurate.

Figure 2:
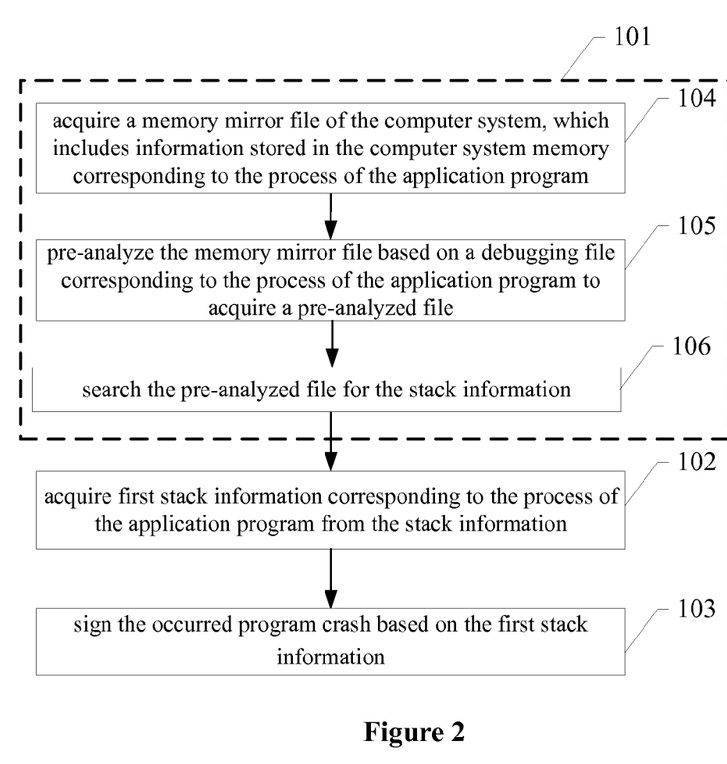
FIG. 2 is a flow chart of a method for signing a program crash according to an embodiment of the disclosure.

Referring to FIG. 2, in a specific embodiment, the above step 101 may further includes the following steps.

Step 104 includes acquiring a memory mirror file of the computer system, i.e. a dump file. The memory mirror file is a file generated when the program crash occurs during executing the process of the application program by the computer system.

It can be understood that, during executing the process of the application program by the computer system, information such as content of corresponding executable program in the application program may be mapped into the memory of the computer system; and when the program crash occurs during executing the process of the application program, the information in the memory corresponding to the process of the application program may be stored as a dump file by the computer system. The dump file may include: mapping information of the executable program in the memory (including, for example, a function address and an offset of the application program); the stack information invoked when the process of the application program is executed; and other information for pinpointing the reason of the crash when the program crash occurs, such as a process name (PROCESS_NAME) and a primary problem class (PRIMARY_PROBLEM_CLASS).

Which information is included in the dump file needs to be determined by a pre-analysis method. Specifically, a windbg tool, which is a debugging tool for a user mode and a kernel mode, may be used to analyze the types of information stored in the dump file, and may also roughly analyze information such as the reason for the program crash. The windbg tool provides multiple command line parameters, and the analyze-v command is mainly used to extract required information such as stack information from the dump file when analyzing and processing the dump file.

Step 105 includes pre-analyzing the memory mirror file based on a debugging file corresponding to the process of the application program, i.e., a pdb file corresponding to the process of the application program, to acquire a pre-analyzed file.

Step 106 includes searching the pre-analyzed file for the stack information.

It can be understood that, since the debugging file includes information such as names, addresses and types of various functions and variables in the application program, and name and the number of lines of a source code file, what type of information being stored in the dump file can be acquired by analyzing and processing the content in the dump file based on the debugging file, thereby the stack information can be acquired.

The stack information invoked when the program crash occurs may be acquired by the above steps 104 and 105. During executing the process of the application program by the computer system, the operation of the computer system itself needs to be firstly ensured, i.e., the second stack information corresponding to the computer system needs to be firstly invoked, and then the first stack information corresponding to the process of the application program is invoked, therefore, in the stack information, the second stack information is generally at a position closing to the stack bottom, and the first stack information is generally at a position closing to the stack top. Therefore, the device for singing the program crash performs the above step 102, i.e., acquires the first stack information may include: acquiring, from the stack information, part of the stack information that is from the stack top to an N-th layer (such as the third layer) of the stack information, to be used as the first stack information; or acquire, from the stack top to the stack bottom of the stack information, M layers of the stack information (such as 20 layers), to be used as the first stack information; or acquire all of the stack information to be used as the first stack information if the stack information is less than M layers. Here, N and M are both positive integers.

In an implementation, the stack information and other information, such as the class of the reason that the program crash occurs acquired by pre-analyzing (i.e., PRIMARY_PROBLEM_ CLASS information in the pre-analyzed file) and/or other information in addition to the stack information stored in the computer system memory corresponding to the process of the application program (i.e., FOLLOW_IP information in the pre-analyzed file), can be obtained by pre-analyzing the dump file. Therefore, in order to distinguish program crashes due to different reasons for processes of two application programs which are substantially the same, the device for signing the program crash needs to sign the program crash based on the first stack information in conjunction with the other information in executing the above step 103.

Specifically, the device for signing the program crash may concatenate the first stack information with any one or more of the class of the reason included in the pre-analyzed file and the other information stored in the computer memory to acquire concatenated information, and calculate an information identifier of the concatenated information to acquire a signature for the program crash.

In addition, if the stack information, the class of the reason for the program crash and the other information in addition to the stack information stored in the computer system memory corresponding to the process of the application program described above are not searched out in the pre-analyzed file by the device for signing the program crash, it is determined that the memory mirror file acquired in step 104 is invalid, and the device for signing the program crash re-acquires the memory mirror file from the computer system, and then acquire the stack information according to the above steps 104 to 106.

Figure 3:
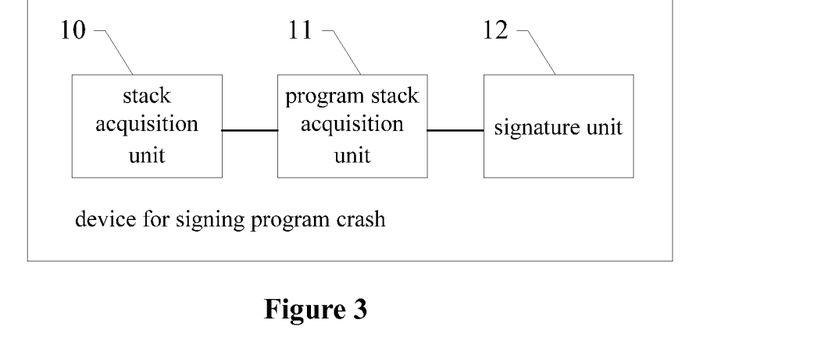
FIG. 3 is a structural schematic diagram of a device for signing a program crash according to an embodiment of the disclosure.

A device for signing a program crash is further provided according to an embodiment of the disclosure. The structural schematic diagram of the device is shown in FIG. 3, which includes:

a stack acquisition unit 10, adapted to acquire stack information invoked when the program crash occurs during executing a process of an application program by a computer system;

a program stack acquisition unit 11, adapted to acquire first stack information corresponding to the process of the application program from the stack information acquired by the stack acquisition unit 10; and a signature unit 12, adapted to sign the occurred program crash based on the first stack information acquired by the program stack acquisition unit 11. The signature unit 12 may calculate an information identifier of the first stack information, for example, calculate a MD5 value of the first crack information by Hash Algorithm. Alternatively, the signature unit 12 may concatenate the first stack information with some other information stored in the memory corresponding to the process of the application program when the program crash occurs, and calculates an information identifier of the concatenated information. Such calculated information identifier may be used to uniquely identify the reason that the program crash occurs.

In the embodiment of the disclosure, the stack acquisition unit 10 of the device for signing the program crash firstly acquires stack information invoked when the program crash occurs during executing a process of an application program by a computer system, then the program stack acquisition unit 11 acquires first stack information corresponding to the process of the application program from the acquired stack information, and the signature unit 12 signs the occurred program crash based on the first stack information. In this way, since the first stack information corresponding to a process of an application program can reflect the essence of the process of the application program and does not vary with different settings of computer systems of different users, i.e., different running environments of the process of the application program, therefore, the signature for the program crash acquired by the first stack information can be used to uniquely determine the reason that the program crash occurs, and the case that signatures for program crashes due to a same reason may be different for processes of two application programs which are substantially the same is avoided, thereby the finally determined reason for the program crash is accurate.

Figure 4:
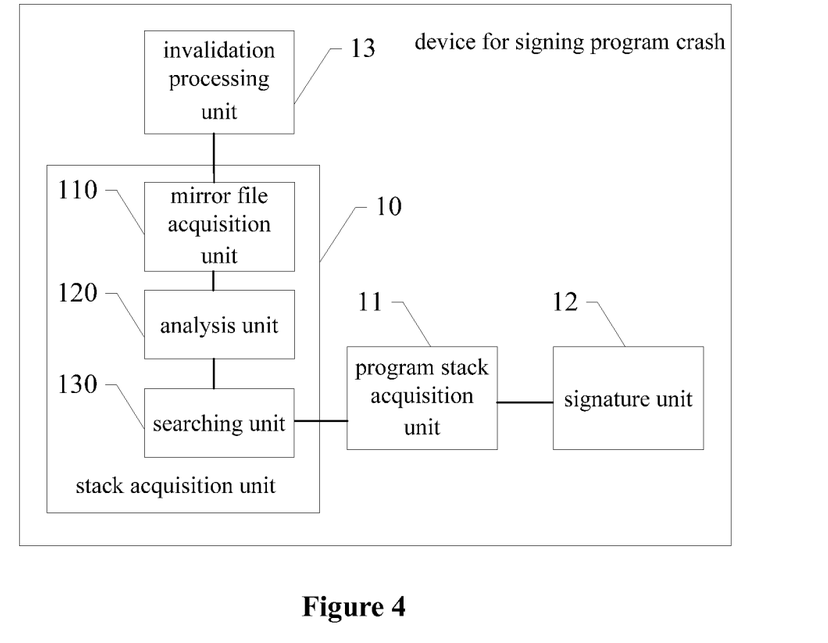
FIG. 4 is a structural schematic diagram of a device for signing a program crash according to an embodiment of the disclosure.

Referring to FIG. 4, in a specific embodiment, in addition to the structure shown in FIG. 3, the device for signing the program crash may further include an invalidation processing unit 13, and the stack acquisition unit 10 of the device may be implemented by a mirror file acquisition unit 110, an analysis unit 120 and a searching unit 130.

The mirror file acquisition unit 110 is adapted to acquire a memory mirror file of the computer system, where the memory mirror file is a file generated when the program crash occurs during executing the process of the application program by the computer system.

The analysis unit 120 is adapted to pre-analyze the memory mirror file acquired by the mirror file acquisition unit 110 based on a debugging file corresponding to the process of the application program to acquire a pre-analyzed file. Specifically, the analysis unit 120 may use a windbg tool to analyze the dump file, acquire that what type of information is stored in the dump file by analyzing and processing the content in the dump file based on the content included in the debugging file, and finally acquire that what type of information is stored in the stack information. Furthermore, the analysis unit 120 may also roughly analyze information such as the reason for the program crash.

The searching unit 130 is adapted to search the pre-analyzed file acquired by the analysis unit 120 for the stack information.

In the device for signing the program crash according to the embodiment, the pre-analyzed file may be acquired by the mirror file acquisition unit 110 and the analysis unit 120 in the stack acquisition unit 10, and the stack information may be searched out from the pre-analyzed file by the searching unit 130, then the first stack information is acquired by the program stack acquisition unit 11 from the stack information searched out by the searching unit 130. Specifically, the program stack acquisition unit 11 may acquire, from the stack information, part of the stack information that is from a stack top to an N-th layer of the stack information, to be used as the first stack information, or acquire, from a stack top to a stack bottom of the stack information, M layers in the stack information, to be used as the first stack information, or acquire all of the stack information to be used as the first stack information if the stack information is less than M layers.

If the searching unit 130 further searches out, in the pre-analyzed file, the class of the reason for the program crash acquired by pre-analysis and/or other information in addition to the stack information stored in the computer system memory corresponding to the process of the application program, the signature unit 12, in performing the signing, concatenates the first stack information with any one or more of the class of the reason and the other information stored in the computer memory to acquire concatenated information, and calculates an information identifier of the concatenated information to acquire a signature for the program crash.

If the stack information, the class of the reason for the program crash, and other information in addition to the stack information stored in the computer system memory corresponding to the process of the application program are not searched out from the pre-analyzed file by the searching unit 130, the invalidation processing unit 13 determines that the memory mirror file is invalid, and notifies the mirror file acquisition unit 110 to re-acquire the memory mirror file from the computer system.

Figure 5:
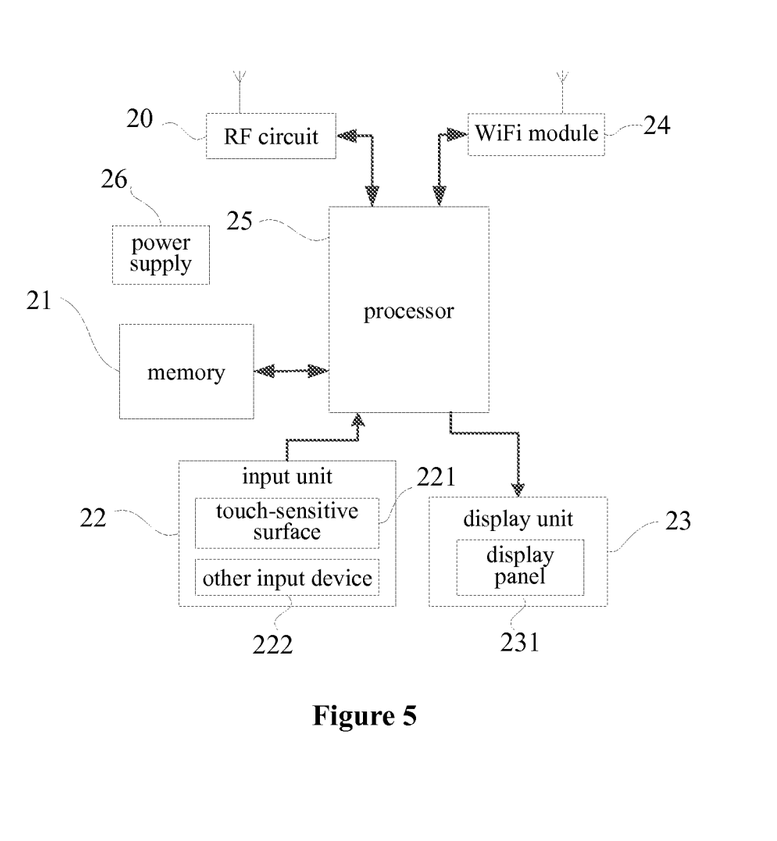
FIG. 5 is a structural schematic diagram of applying a method for signing a program crash to a server according to an embodiment of the disclosure.

The following description is mainly made by taking a case that the method for signing the program crash according to the embodiments of the disclosure is applied to a server as an example. Referring to FIG. 5, a structural schematic diagram of a related server in the embodiment of the disclosure is shown.

The server may include, for example, a Radio Frequency (RF) circuit 20, a memory 21 including one or more computer readable storage mediums, an input unit 22, a display unit 23, a wireless fidelity (WiFi) module 24, a processor 25 including one or more processing cores and a power supply 26. It can be understood by those skilled in the art that, the server is not limited to the structure of the server shown in FIG. 5, and the server may include more or less components, or combined components, or different-arranged components compared with those shown in FIG. 5.

The RF circuit 20 may be used to receive and transmit signals in information receiving and transmitting. Specifically, the received information is delivered to one or more processor 25 to be processed. Generally, the RF circuit 20 includes but not limited to an antenna, at least one amplifier, a tuner, one or more oscillators, a transceiver, a coupler, a Low Noise Amplifier (LNA), and a duplexer. In addition, the RF circuit 20 may communicate with other devices via wireless communication and network. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, and Short Messaging Service (SMS).

The memory 21 may be used to store software programs and modules, and the processor 25 may execute various function applications and data processing by running the software programs and modules stored in the memory 21. The memory 21 may mainly include a program storage area and a data storage area, where the program storage area may be used to store, for example, the operating system and the application program required by at least one function, and the data storage area may be used to store, for example, data established according to the use of the server. In addition, the memory 21 may include a high-speed random access memory and a nonvolatile memory, such as at least one magnetic disk memory, a flash memory, or other volatile solid-state memory. Accordingly, the memory 21 may also include a memory controller to provide access to the memory 21 for the processor 25 and the input unit 22.

The input unit 22 may be used to receive input numeric or character information, and to generate a keyboard, a mouse, a joystick, an optical or trackball signal input related to user setting and function control. In a specific embodiment, the input unit 22 may include a touch-sensitive surface 221 and other input device 222. The touch-sensitive surface 221 is also referred to as a touch display screen or a touch pad, and may collect a touch operation thereon or thereby (for example, an operation on or around the touch-sensitive surface 221 that is made by the user with a finger, a touch pen and any other suitable object or accessory), and drive corresponding connection devices according to a preset procedure. Optionally, the touch-sensitive surface 221 may include a touch detection device and a touch controller. The touch detection device detects touch direction of the user, detects a signal generated by the touch operation, and transmits the signal to the touch controller. The touch controller receives touch information from the touch detection device, converts the touch information into touch coordinates and transmits the touch coordinates to the processor 25. The touch controller is also able to receive a command transmitted from the processor 25 and execute the command. In addition, the touch-sensitive surface 221 may be implemented by, for example, a resistive surface, a capacitive surface, an infrared surface and a surface acoustic wave surface. In addition to the touch-sensitive surface 221, the input unit 22 may also include other input device 222. Specifically, the other input device 222 may include but not limited to one or more of a physical keyboard, a function key (such as a volume control button, a switch button), a trackball, a mouse and a joystick.

The display unit 23 may be used to display information input by the user or information provided for the user and various graphical user interfaces (GUI) of the server, these GUIs may be formed by a graph, a text, an icon, a video and any combination thereof. The display unit 23 may include a display panel 231. Optionally, the display panel 231 may be formed in a form of a Liquid Crystal Display (LCD), an Organic Light-Emitting Diode (OLED) or the like. In addition, the display panel 231 may be covered by the touch-sensitive surface 221. When the touch-sensitive surface 221 detects a touch operation thereon or thereby, the touch-sensitive surface 221 transmits the touch operation to the processor 25 to determine the type of the touch event, and then the processor 25 provides a corresponding visual output on the display panel 231 according to the type of the touch event. Although the touch-sensitive surface 221 and the display panel 231 implement the input and output functions as two separate components in FIG. 5, the touch-sensitive surface 221 and the display panel 231 may be integrated together to implement the input and output functions in other embodiment.

WiFi is a short-range wireless transmission technique. The server may, for example, send and receive E-mail, browse a webpage and access a streaming media for the user by the WiFi module 24, and provide wireless broadband Internet access for the user. Although the WiFi module 24 is shown in FIG. 5, it can be understood that the WiFi module 24 is not necessary for the server, and may be omitted as needed within a scope of the essence of the disclosure.

The processor 25 is a control center of the server, which connects various parts of the mobile phone by using various interfaces and wires, and implements various functions and data processing of the server by running or executing the software programs and/or modules stored in the memory 21 and invoking data stored in the memory 21, thereby monitoring the mobile phone as a whole. Optionally, the processor 25 may include one or more processing cores. Preferably, an application processor and a modem processor may be integrated into the processor 25. The application processor is mainly used to process, for example, an operating system, a user interface and an application program. The modem processor is mainly used to process wireless communication. It can be understood that, the above modem processor may not be integrated into the processor 25.

The server also includes a power supply 26 (such as a battery) for powering various components. Preferably, the power supply may be logically connected with the processor 25 via a power management system, therefore, functions such as charging, discharging and power management are implemented by the power management system. The power supply 26 may also include one or more of a DC or AC power supply, a recharging system, a power failure detection circuit, a power converter or an inverter, a power status indicator and any other assemblies.

Although not shown, the server may also include other modules, which are not described herein. Specifically, in the embodiment, the processor 25 in the server may execute one or more processes of the application program stored in the memory 21 according to the following instructions, to achieve various functions:

acquiring stack information invoked when a program crash occurs during executing a process of an application program by a computer system;

acquiring first stack information corresponding to the process of the application program from the stack information; and signing the occurred program crash based on the first stack information.

Specifically, in acquiring the stack information, the processor 25 firstly acquires a memory mirror file of the computer system, which is a file generated when the program crash occurs during executing the process of the application program by the computer system, then pre-analyzes the memory mirror file based on a debugging file corresponding to the process of the application program to acquire a pre-analyzed file, and finally searches the pre-analyzed file for the stack information.

For the acquisition of the first stack information, the processor 25 may acquire, from the stack information, part of the stack information that is from a stack top to an N-th layer of the stack information, to be used as the first stack information, or acquires, from a stack top to a stack bottom of the stack information, M layers of the stack information, to be used as the first stack information, or acquires all of the stack information to be used as the first stack information if the stack information is less than M layers.

If the processor 25 also searches out, in the pre-analyzed file, a class of a reason for the program crash acquired by pre-analyzing and/or other information in addition to the stack information stored in the computer system memory corresponding to the process of the application program, the processor 25, in performing the signature, concatenates the first stack information with any one or more of the class of the reason and the other information stored in the computer memory to acquire concatenated information, and calculates an information identifier of the concatenated information to acquire a signature for the program crash.

In addition, if the processor 25 does not search out, in the pre-analyzed file, the stack information, the class of the reason for the program crash, and the other information in addition to the stack information stored in the computer system memory corresponding to the process of the application program, the processor 25 determines that the memory mirror file is invalid, and re-acquires the memory mirror file from the computer system.

Those skilled in the art can understand that, all or part of the steps in each method of the embodiments described above may be implemented by instructing related hardware with a program, the program may be stored in a computer readable medium which may include, for example, a Read-Only Memory (ROM), a Random Access Memory (RAM), a magnetic disk and an optical disk.

The method and device for signing the program crash provided by the embodiments of the disclosure are illustrated in detail above, and specific examples are applied herein to illustrate the principle and the embodiments of the disclosure. The illustration of the above embodiments is merely used to facilitate understanding the method and the core idea of the disclosure. For those skilled in the art, some variation may be made for specific embodiments and application scope according to the idea of the disclosure. In summary, the content of this disclosure should not be interpreted as limiting the invention.

The invention claimed is:

1. A method for signing a program crash, comprising:

acquiring, by a device having a processor, stack information invoked when the program crash occurs during executing a process of an application program by a computer system;

acquiring, by the device, first stack information corresponding to the process of the application program from the stack information; and signing, by the device, the occurred program crash based on the first stack information, wherein acquiring stack information invoked when the program crash occurs during executing a process of an application program by a computer system comprises:

acquiring, by the device, a memory mirror file of the computer system, wherein the memory mirror file is a file generated when the program crash occurs during executing the process of the application program by the computer system;

pre-analyzing, by the device, the memory mirror file based on a debugging file corresponding to the process of the application program, to acquire a pre-analyzed file; and searching, by the device, the pre-analyzed file for the stack information.

2. The method according to claim 1, wherein acquiring first stack information corresponding to the process of the application program from the stack information comprises at least one of the following:

acquiring, from the stack information, part of the stack information that is from a stack top to an N-th layer of the stack information, to be used as the first stack information;

acquiring, from a stack top to a stack bottom of the stack information, M layers of the stack information, to be used as the first stack information; and acquiring all of the stack information to be used as the first stack information if the stack information is less than M layers.

3. The method according to claim 1, wherein if a class of a reason for the program crash that is acquired by the pre-analyzing and/or other information in addition to the stack information stored in a computer system memory corresponding to the process of the application program are searched out in the pre-analyzed file, signing the occurred program crash based on the first stack information comprises:

concatenating the first stack information with at least one of the class of the reason and the other information stored in the computer system memory to acquire concatenated information, and calculating an information identifier of the concatenated information to acquire a signature for the program crash.

4. The method according to claim 1, further comprising:
if the stack information, the class of the reason for the program crash, and the other information in addition to the stack information stored in the computer system memory corresponding to the process of the application program are not searched out in the pre-analyzed file, determining that the memory mirror file is invalid, and re-acquiring the memory mirror file from the computer system.

5. The method according to claim 2, further comprising:
if the stack information, the class of the reason for the program crash, and the other information in addition to the stack information stored in the computer system memory corresponding to the process of the application program are not searched out in the pre-analyzed file, determining that the memory mirror file is invalid, and re-acquiring the memory mirror file from the computer system.

6. The method according to claim 3, further comprising:
if the stack information, the class of the reason for the program crash, and the other information in addition to the stack information stored in the computer system memory corresponding to the process of the application program are not searched out in the pre-analyzed file, determining that the memory mirror file is invalid, and re-acquiring the memory mirror file from the computer system.

7. A device for signing a program crash, comprising a processor and a non-transitory storage medium accessible to the processor, the non-transitory storage medium configured to store units comprising:
a stack acquisition unit, adapted to acquire stack information invoked when the program crash occurs during executing a process of an application program by a computer system;
a program stack acquisition unit adapted to acquire first stack information corresponding to the process of the application program from the stack information; and
a signature unit, adapted to sign the occurred program crash based on the first stack information,
wherein the stack acquisition unit comprises:
a mirror file acquisition unit, adapted to acquire a memory mirror file of the computer system, wherein the memory mirror file is a file generated when the program crash occurs during executing the process of the application program by the computer system;
an analysis unit, adapted to pre-analyze the memory mirror file based on a debugging file corresponding to the process of the application program, to acquire a pre-analyzed file; and
a searching unit, adapted to search the pre-analyzed file for the stack information.

8. The device according to claim 7, wherein,
the program stack acquisition unit is further adapted to perform at least one of the following:
acquire, from the stack information, part of the stack information that is from a stack top to an N-th layer of the stack information, to be used as the first stack information;
acquire, from a stack top to a stack bottom of the stack information, M layers of the stack information, to be used as the first stack information; and
acquire all of the stack information to be used as the first stack information if the stack information is less than M layers.

9. The device according to claim 7, wherein,
the searching unit is further adapted to search the pre-analyzed file for a class of a reason for the program crash that is acquired by the pre-analyzing and/or other information in addition to the stack information stored in a computer system memory corresponding to the process of the application program; and
the signature unit is adapted to concatenate the first stack information with at least one of the class of the reason and the other information stored in the computer system memory to acquire concatenated information, and calculate an information identifier of the concatenated information to acquire a signature for the program crash.

10. The device according to claim 7, further comprising:
an invalidation processing unit, adapted to, if the stack information, the class of the reason for the program crash and the other information in addition to the stack information stored in the computer system memory corresponding to the process of the application program are not searched out in the pre-analyzed file, determine that the memory mirror file is invalid and notify the mirror file acquisition unit to re-acquire the memory mirror file from the computer system.

11. The device according to claim 8, further comprising:
an invalidation processing unit, adapted to, if the stack information, the class of the reason for the program crash and the other information in addition to the stack information stored in the computer system memory corresponding to the process of the application program are not searched out in the pre-analyzed file, determine that the memory mirror file is invalid and notify the mirror file acquisition unit to re-acquire the memory mirror file from the computer system.

12. The device according to claim 9, further comprising:
an invalidation processing unit, adapted to, if the stack information, the class of the reason for the program crash and the other information in addition to the stack information stored in the computer system memory corresponding to the process of the application program are not searched out in the pre-analyzed file, determine that the memory mirror file is invalid and notify the mirror file acquisition unit to re-acquire the memory mirror file from the computer system.

13. A non-transitory storage medium storing a computer program, wherein execution of the computer program causes a processor to perform acts comprising:
acquiring stack information invoked when the program crash occurs during executing a process of an application program by a computer system;
acquiring first stack information corresponding to the process of the application program from the stack information; and
signing the occurred program crash based on the first stack information,
wherein acquiring stack information invoked when the program crash occurs during executing a process of an application program by the computer system comprises:
acquiring a memory mirror file of the computer system, wherein the memory mirror file is a file generated when the program crash occurs during executing the process of the application program by the computer system;
pre-analyzing the memory mirror file based on a debugging file corresponding to the process of the application program, to acquire a pre-analyzed file; and
searching the pre-analyzed file for the stack information.

14. The non-transitory storage medium according to claim 13, wherein acquiring first stack information corresponding to the process of the application program from the stack information comprises at least one of the following:
- acquiring, from the stack information, part of the stack information that is from a stack top to an N-th layer of the stack information, to be used as the first stack information;
- acquiring, from a stack top to a stack bottom of the stack information, M layers of the stack information, to be used as the first stack information; and
- acquiring all of the stack information to be used as the first stack information if the stack information is less than M layers.

15. The non-transitory storage medium according to claim 13, wherein execution of the computer program causes the processor to perform acts further comprising:
- if the stack information, the class of the reason for the program crash, and the other information in addition to the stack information stored in the computer system memory corresponding to the process of the application program are not searched out in the pre-analyzed file, determining that the memory mirror file is invalid, and re-acquiring the memory mirror file from the computer system.

* * * * *